(12) United States Patent
Hollander

(10) Patent No.: US 7,982,411 B2
(45) Date of Patent: Jul. 19, 2011

(54) IGNITION AND OPERATION OF ELECTRONIC HIGH INTENSITY DISCHARGE LAMPS

(75) Inventor: Jonathan Hollander, Hod Hasharon (IL)

(73) Assignee: Metrolight Ltd., Netanya (IL)

( * ) Notice: Subject to any disclaimer, the term of this patent is extended or adjusted under 35 U.S.C. 154(b) by 371 days.

(21) Appl. No.: 12/278,163

(22) PCT Filed: Feb. 6, 2007

(86) PCT No.: PCT/IL2007/000154
§ 371 (c)(1),
(2), (4) Date: Aug. 4, 2008

(87) PCT Pub. No.: WO2007/091252
PCT Pub. Date: Aug. 16, 2007

(65) Prior Publication Data
US 2009/0033238 A1 Feb. 5, 2009

Related U.S. Application Data

(60) Provisional application No. 60/765,187, filed on Feb. 6, 2006.

(51) Int. Cl.
*H05B 37/02* (2006.01)

(52) U.S. Cl. ......... 315/307; 315/224; 315/244; 315/247

(58) Field of Classification Search .............. 315/209 R, 315/224–226, 244–247, 283, 284, 287, 291, 315/294, 307–308
See application file for complete search history.

(56) References Cited

U.S. PATENT DOCUMENTS

| | | | | |
|---|---|---|---|---|
| 2,916,669 A | * | 12/1959 | Retzer et al. | ........... 315/183 |
| 5,363,020 A | * | 11/1994 | Chen et al. | ........... 315/209 R |
| 6,002,214 A | * | 12/1999 | Ribarich | ........... 315/307 |
| 6,031,342 A | * | 2/2000 | Ribarich et al. | ........... 315/291 |
| 6,081,077 A | * | 6/2000 | Canova et al. | ........... 315/307 |
| 6,522,089 B1 | | 2/2003 | Duong et al. | |
| 7,019,468 B2 | * | 3/2006 | Deurloo et al. | ........... 315/291 |
| 2003/0137257 A1 | * | 7/2003 | Collins et al. | ........... 315/224 |
| 2004/0130274 A1 | * | 7/2004 | DuLaney et al. | ........... 315/291 |
| 2004/0257000 A1 | * | 12/2004 | Maria Langeslag | ........... 315/209 R |

OTHER PUBLICATIONS

Design and Analysis of Automotive High Intensity Discharge Lamp Ballast Using Micro Controller Unit, Kyu-Chan Lee, IEEE Transactions on Power Electronics, vol. 18, No. 6, Nov. 2003, pp. 1356-1364.
Notice of Deficiencies in IL patent application 193084 of Mar. 3, 2011.

* cited by examiner

*Primary Examiner* — Douglas W Owens
*Assistant Examiner* — Tung X Le
(74) *Attorney, Agent, or Firm* — The Law Office of Michael E. Kondoudis

(57) ABSTRACT

A method for igniting and operating a high intensity discharge (HID) lamp using an electronic ballast controlled by a ballast microcontroller. An ignition circuit including a parallel capacitive circuit is connected in parallel to the HID lamp. The ignition circuit being resonant at an ignition resonance frequency. An ignition voltage is provided to the HID lamp at the ignition resonance frequency, thereby initiating ignition of the HID lamp. Upon sensing the ignition, the HID lamp is powered at an operation frequency. Both the ignition resonance frequency and the operation frequency are in a high frequency range above fifty kilohertz. The ignition voltage preferably does not include a significant direct current offset The current flowing through the HID lamp is substantially continuous during the transition from providing ignition voltage during the ignition to powering the HID lamp at the operation frequency.

13 Claims, 5 Drawing Sheets

IGNITION AND OPERATION OF ELECTRONIC HIGH INTENSITY DISCHARGE LAMPS

TECHNICAL FIELD

The present invention relates to operating gas discharge lamps and, more particularly, to ignition of and operating high intensity discharge (HID) lamps at high frequencies.

BACKGROUND ART

High intensity discharge (HID) lamps produce light by striking an electrical arc across electrodes housed inside a fused quartz or fused alumina arc chamber. The chamber encloses specific components such as mercury vapor, metal halide, alkali and rare earth metals which are selected based on the wavelength of the radiant emission of the excited states of the metallic components.

Standard low-pressure sodium lamps have the highest efficiency of all HID lamps, but they produce a yellowish light. High-pressure sodium lamps that produce a whiter light, but efficiency is somewhat sacrificed. Metal halide lamps are less efficient but produce an even whiter, more natural light. High-intensity discharge (HID) lamps, typically require power supplied by either magnetic or electronic ballasts. Magnetic ballasts provide electrical power to the HID lamp during normal steady-state operation typically at power line frequency, e.g. 50-60 Hz and electronic ballasts provide electrical power to the HID lamp typically at a low-frequency, e.g. 120 to 200 Hz square wave, quasi-sine, pure sine wave or rectangular waveform.

High intensity discharge (HID) lamps suffer from acoustic resonances when HID lamps are operated at high frequencies, i.e., between a few kHz to about two hundred kHz, depending on the dimensions of the lamp. Acoustic resonance causes the radiant arc within the lamp to gyrate, flicker, and even be extinguished. When acoustic resonance occurs and the arc extinguishes typically within milliseconds, hot restart becomes a major limitation in such a lamp-ballast system. However, when the lamps are operated at high frequencies, i.e., above the highest acoustic resonance which depends on the dimensions of the lamp (e.g. ~50-120 kHz for a 400 Watt metal halide lamp), lamp performance is not adversely affected. Consequently, there are manufacturers of HID electronic ballasts which power the lamp with high-frequency power, at frequencies just beyond the acoustic resonance range. The frequency of high frequency electronic ballasts is conventionally selected to be high enough to avoid acoustic resonances, but not so high as to increase cost and complexity of the ballast circuit.

The issue of acoustic resonance is further compounded by the fact that the acceptable acoustic window is different for arc tubes made even by the same lamp producer and between different lamp manufacturers. As a result, HID lamp interchangeability is a major constraining factor for both new and retrofit installations. Even if the high frequency ballast and HID lamp are compatible when initially installed, characteristics of the arc tube and/or electrodes change over time and could still result in an acoustic resonance condition later in the lamp life cycle.

There is thus a need for, and it would be highly advantageous to have an electronic ballast which ignites and operates HID lamps, avoiding acoustic resonance at high frequency and universally operates different types of lamp, similar lamps of different manufacturers, whiling maintaining performance over time during the lifetime of the HID lamps.

Luminous flux is a quantitative expression of the brilliance of a source of visible light, which is electromagnetic energy within the wavelength range of approximately 390 nanometers (nm) to 770 nm. This quantity is measured in terms of the power emitted per unit solid angle from an isotropic radiator, a theoretical point source that radiates equally in all directions in three-dimensional space.

The standard unit of luminous flux is the lumen (lm). Reduced to base units in the International System of Units (SI), 1 lm is equivalent to 1 candela steradian (cd·sr). This is the same as 1.46 milliwatt of radiant power at a wavelength of 555 nm, which lies in the middle of the visible spectrum. Lux is a derived unit based on lumen, and lumen is a derived unit based on candela. One lux is equal to one lumen per square meter, where $4\pi$ lumens is the total luminous flux of a light source of one candela of luminous intensity.

SUMMARY OF THE INVENTION

The term "high frequency" as used herein refers to electrical power above fifty kilohertz.

According to features of the present invention, improved starting and operating waveforms associated with high frequency electronic ballasted lamps insure continued good starting so that the optimum ignition and operating waveforms remain the same before and after the multiple stress test cycles in an environmental chamber at elevated ambient temperatures. The use of improved starting and operating waveforms insures good lamp-ballast compatibility and validates good ballast reliability.

According to the present invention there is provided a method for igniting and operating a high intensity discharge (HID) lamp using an electronic ballast controlled by a ballast microcontroller. An ignition circuit including a parallel capacitive circuit is connected in parallel to the HID lamp. The ignition circuit being resonant at an ignition resonance frequency. An ignition voltage is provided to the HID lamp at the ignition resonance frequency, thereby initiating ignition of the HID lamp. Upon sensing the ignition, the HID lamp is powered at an operation frequency. Both the ignition resonance frequency and the operation frequency are in a high frequency range above fifty kilohertz or above eighty kilohertz or above 120 Khz. The ignition voltage preferably does not include a significant direct current offset The current flowing through the HID lamp is substantially continuous during the transition from providing ignition voltage during the ignition to powering the HID lamp at the operation frequency. The ignition resonance frequency is preferably greater than eighty kilohertz, or greater than one hundred kilohertz. The operation frequency is preferably less than half the ignition resonance frequency. The ignition voltage preferably has an absolute value peak voltage of greater than one kilovolt. Ignition preferably occurs within five milliseconds after providing the ignition voltage. The ignition voltage preferably has an absolute value peak voltage of significantly greater than the absolute value peak operation voltage during the powering at the operation frequency.

According to the present invention there is provided an electronic ballast controlled by a ballast microcontroller which performs a method as disclosed herein, the electronic ballast including the ignition circuit including the parallel capacitive circuit connected in parallel to the HID lamp, the ignition circuit being resonant at said ignition resonance frequency, a drive mechanism controlled by the ballast microcontroller. The drive mechanism provides the ignition voltage to the HID lamp at the ignition resonance frequency, and thereby initiates the ignition of the HID lamp; and a sensing mechanism which senses the ignition. Both the ignition resonance frequency and the operation frequency are both in a high frequency range above fifty kilohertz.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
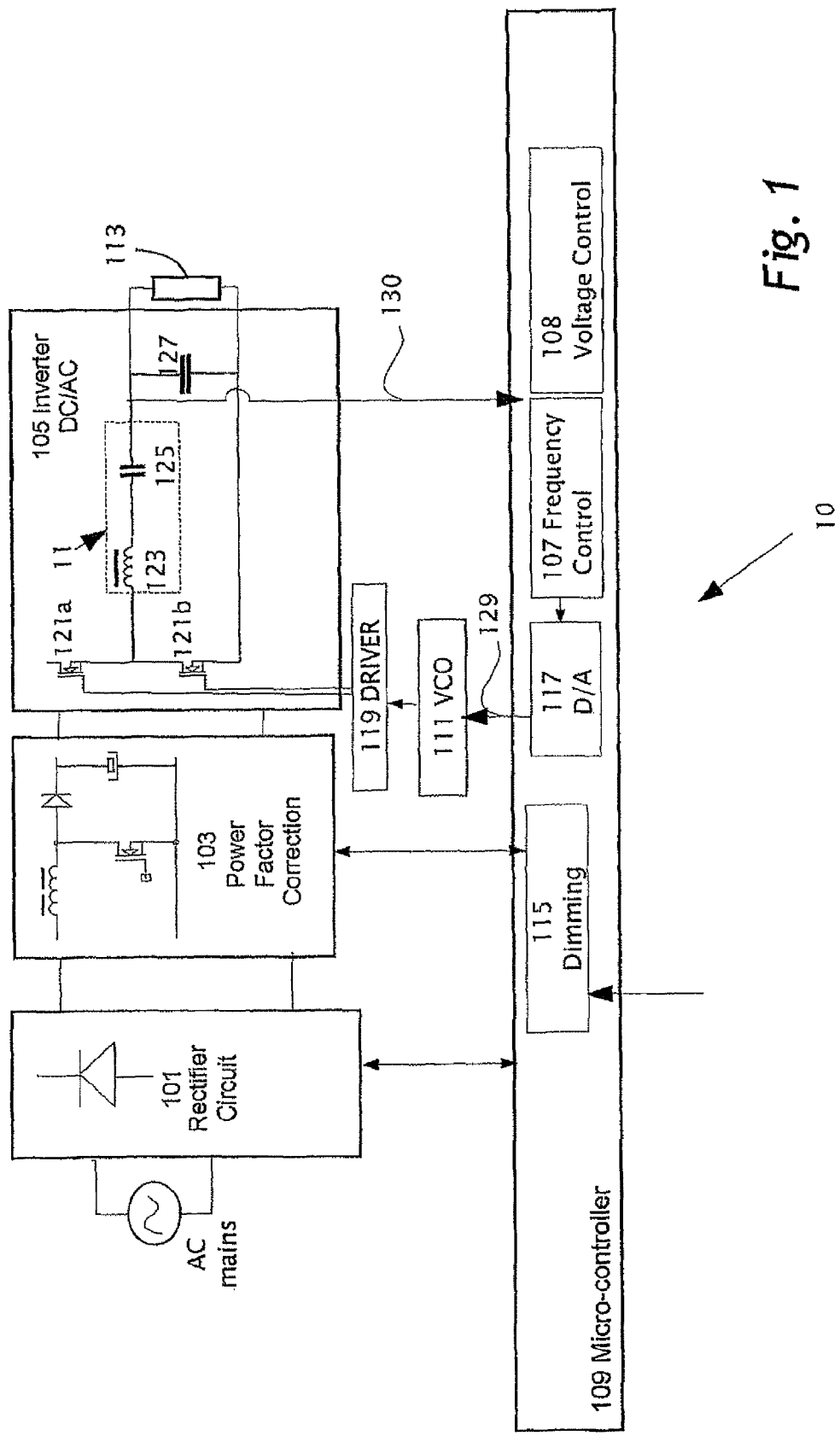
FIG. 1 is a simplified block diagram of a ballast circuit, according to an embodiment of the present invention.

The present invention is of an HID ballast under microprocessor control, and a method of operating an HID lamp at high frequency. Specifically, the method of operating includes ignition at a high frequency, typically at a resonant frequency of a resonant circuit connected in parallel with the HID lamp. The ballast microcontroller preferably senses the onset of ignition and preferably in a continuous way, without abruptly changing the lamp current, powers the HID lamp at a different high frequency and voltage The principles and operation of ignition and operation of an HID lamp at high frequency, according to the present invention, may be better understood with reference to the drawings and the accompanying description.

It should be noted, that although the discussion herein relates to a standard 400 W metal halide lamp, (e.g. 400 W HID lamp Model Number M400U/BU Metalarc manufactured by Osram/Sylvania.) the present invention may, by non-limiting example, alternatively be configured as well using other lamp types, power ratings and manufacturers.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, principal intentions of the present invention are to ignite and operate HID lamps, avoiding acoustic resonance at high frequency and universally operate different types of lamp, lamps of different manufacturers, whiling maintaining performance over time during the lifetime of the HID lamps. Another feature of HID lamp/ballast, according to embodiments of the present invention, is the fact that the HID lamp can be dimmed to about 50% of its full wattage rating with proper microprocessor control circuitry. Additional energy savings possibilities can be accomplished and that complete compatibility with daylight harvesting can more easily be implemented. It should also be noted these electronic high frequency HID systems have prime applications in outdoor lighting and are fully compliant with the new Title 24 regulation. These systems maintain essentially constant output wattage throughout life so that the arc tube voltage and wattage does not change appreciably even under varied end of life (EOL) conditions. Another feature of the present invention is light output profile is constant over an extended ambient temperature range from −20 C to +55 C. This is a substantial advantage for usage in outdoor and/or other environmental applications when the temperatures deviate substantially from the normal indoor ambient temperatures (25 C). Another feature of the high frequency electronic ballast, according to embodiments of the present invention with some HID lamps, such as Natural White, is the fact that the correlated color temperature (CCT) of the lamp remains essentially constant over the life of the lamp which improves that aspect of the overall performance.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Referring now to the drawings, FIG. 1 illustrates a simplified block diagram of a ballast circuit, according to an embodiment of the present invention.

High frequency ballast circuit 10 includes a rectifier circuit 101 followed by a power factor control circuit 103 followed by either a "half bridge" or a "full bridge" inverter circuit 105 operating at high frequency. The frequency of operation controlled by software 107 in ballast microcontroller 109, by outputting a control voltage 129 from a digital to analog (D/A) converter 117 to a voltage controlled oscillator (VCO) 111. Ballast microcontroller 109 is a control device, such as a PIC16C73B 8-Bit CMOS microcontroller manufactured by Microchip Technology Inc. VCO 111 provides a VCO output signal to driver 119, which alternately provides a high gate signal and a low gate signal to first switch, e.g FET 121a and second switch, e.g. FET 121b, respectively. Rail voltage output (not shown) supplies power to first switch 121a. Electrical power is supplied across HID lamp 113 and parallel capacitive circuit 127 through inductive circuit 11 including inductive element, e.g. choke 123 and capacitive element 125. An ignition signal, e.g voltage 130 is sensed (for instance) at the connection between the inductive circuit 11 and the HID lamp 113 and is supplied to ballast microcontroller 109. The ignition circuit uses the resonance between the inductive circuit 11 and the parallel capacitive circuit 127 to apply the ignition waveform to the HI) lamp 113 preferably at the fundamental harmonic of the resonance.

Figure 2:
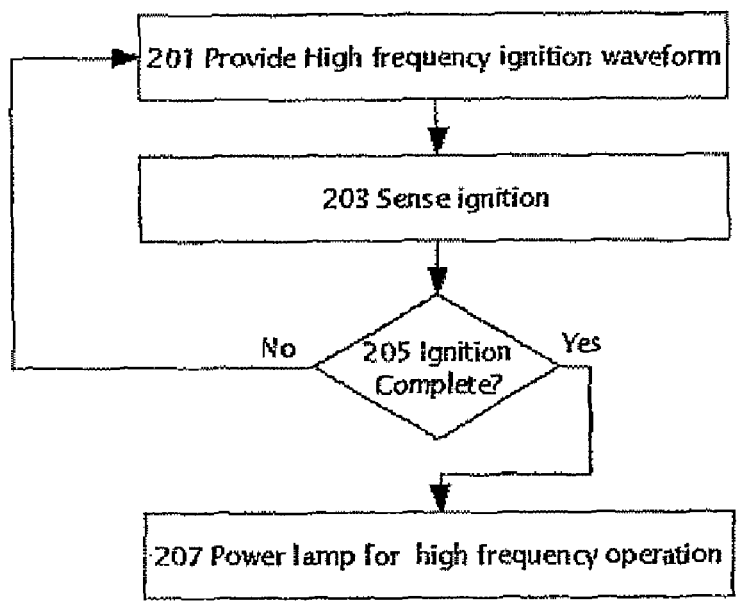
FIG. 2 is a simplified flow diagram according to an embodiment of the present invention of the operation of the ballast circuit of FIG. 1 with an HID lamp.

Reference is now made also to FIG. 2, a flow diagram of the operation of ballast 10 and HID lamp, according to an embodiment of the present invention. The ignition waveform is provided (step 201) typically at the resonance frequency of resonant circuit 11 in combination with parallel capacitor 127. During ignition (step 201) of HID lamp 113, feedback signal 130 is provided to ballast microcontroller 109 so that the ballast microcontroller 109 can control the desired ignition waveform to HID lamp 113. HID lamp 113 when ignited goes from an open circuit to a very low impedance. The impedance change is sensed (step 203) by microcontroller 109 using one or more feedback signals, e.g voltage signal 130 and/or a current sensing feedback signal (not shown in FIG. 1). When ignition is complete (decision block 205) under software control, ballast microcontroller 109 begins to power HID lamp 113 at a different high frequency of operation and typically at a lower absolute value peak voltage compared with the absolute value peak voltage of the ignition waveform. The operating high frequency of HID lamp 113 operation (step 207) is preferably a resonant frequency of circuit 11.

Figure 3A:
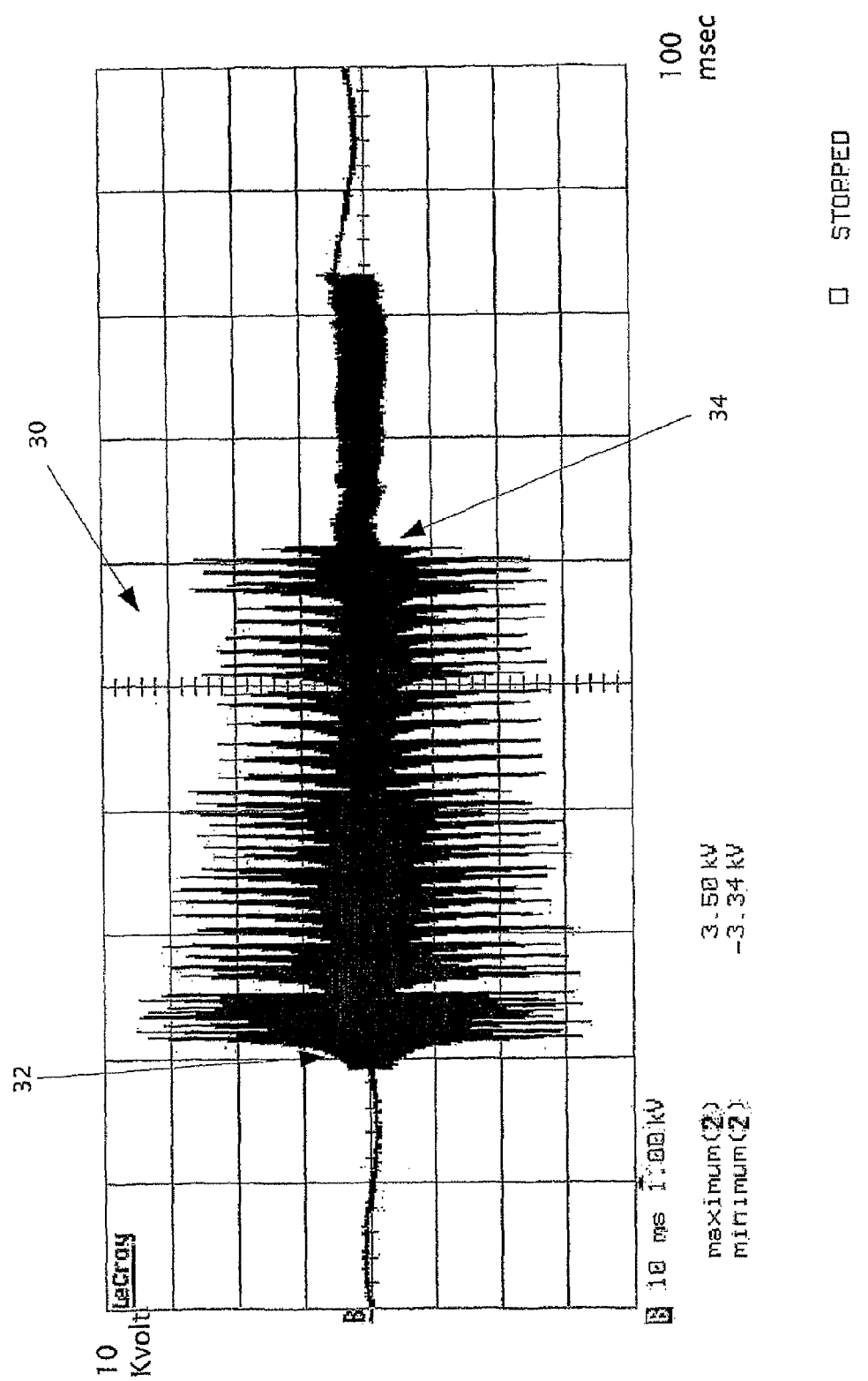
FIG. 3a is an oscilloscope trace of an ignition waveform according to the present invention.
Figure 3B:
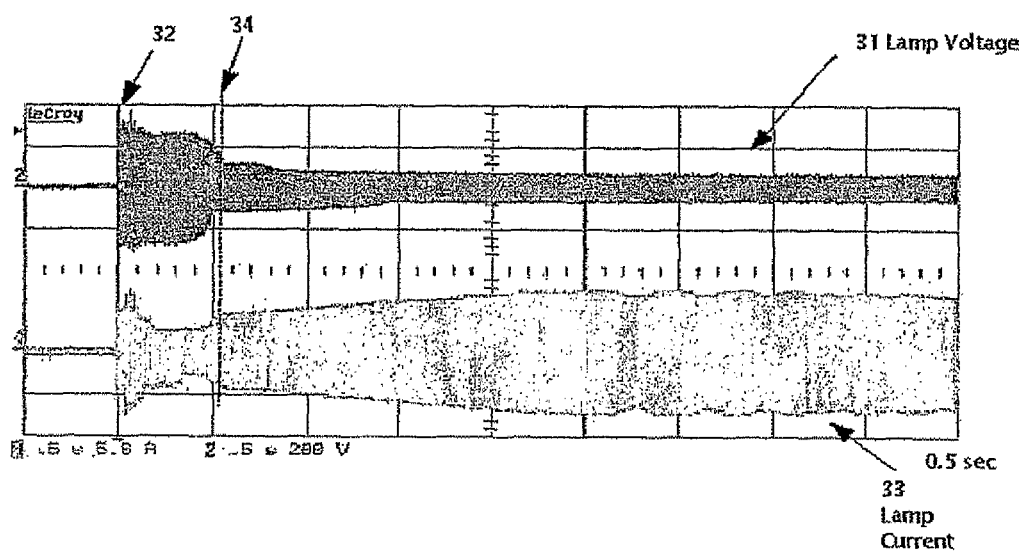
FIG. 3b illustrates oscilloscope traces of sensing signals used for operation of an HID lamp, according to the present invention.

Reference is now made to FIGS. 3a and 3b which illustrate oscilloscope traces of ignition waveform 30 for a lamp 113/ballast 10 combination, according to an embodiment of the present invention. FIG. 3A is a trace scaled to actual voltage of ignition waveform 30. FIG. 3B illustrates a signal 31 (for instance from feedback signal 130) proportional to lamp voltage and a signal 32 proportional to lamp current. Several observations are noted from ignition waveform 30. The ignition waveform peak absolute magnitude is microprocessor controlled at 3.7 kilovolts and the duration of the ignition waveform, from initiation 32 until onset of ignition 34 is about 40 milliseconds. Furthermore, under microprocessor 109 control, according to an embodiment of the present invention, both lamp current and lamp voltage are continuous at onset 34 of ignition, from glow to arc transition, leading to predictable and reliable ignition with minimal stress on lamp 113 and ballast 10. Ignition waveform 30 is capable of producing sufficient ionization for capacitive breakdown within the arc tube even at ambient temperatures as low as −50 C.

Another positive characteristic is that the total ignition time can be as short typically 1-5 milliseconds which substantially minimizes the sputtering at the electrodes of HID lamp 113. In comparison, prior art low frequency magnetic ballasts, have ignition times which often exceed 2500 milliseconds. Long start times increase deleterious sputtering damage at the electrodes as the lamp transitions through the abnormal glow region during the starting process. An improvement caused with use of ignition waveform 30 is visually evidenced by the fact that essentially no damage is done to the electrode structure. Sputtering damage is one of the root causes of the lumen depreciation. Even after prolonged stress testing under worst case conditions in a hot ambient temperature environment with multiple hot re-strikes, the starting signatures are the same as they were before any stress testing was initiated. This test result strongly indicates that all components within electronic ballast 10 remain stable and that the worst case stress scenario of repeating hot re-strikes does not damage ballast 10 or lamp 113 in any way. Repeating these operating waveforms over a wide range of input peak voltages confirmed that the lamp voltage, lamp current, and lamp power profiles were fully acceptable.

Figure 4:
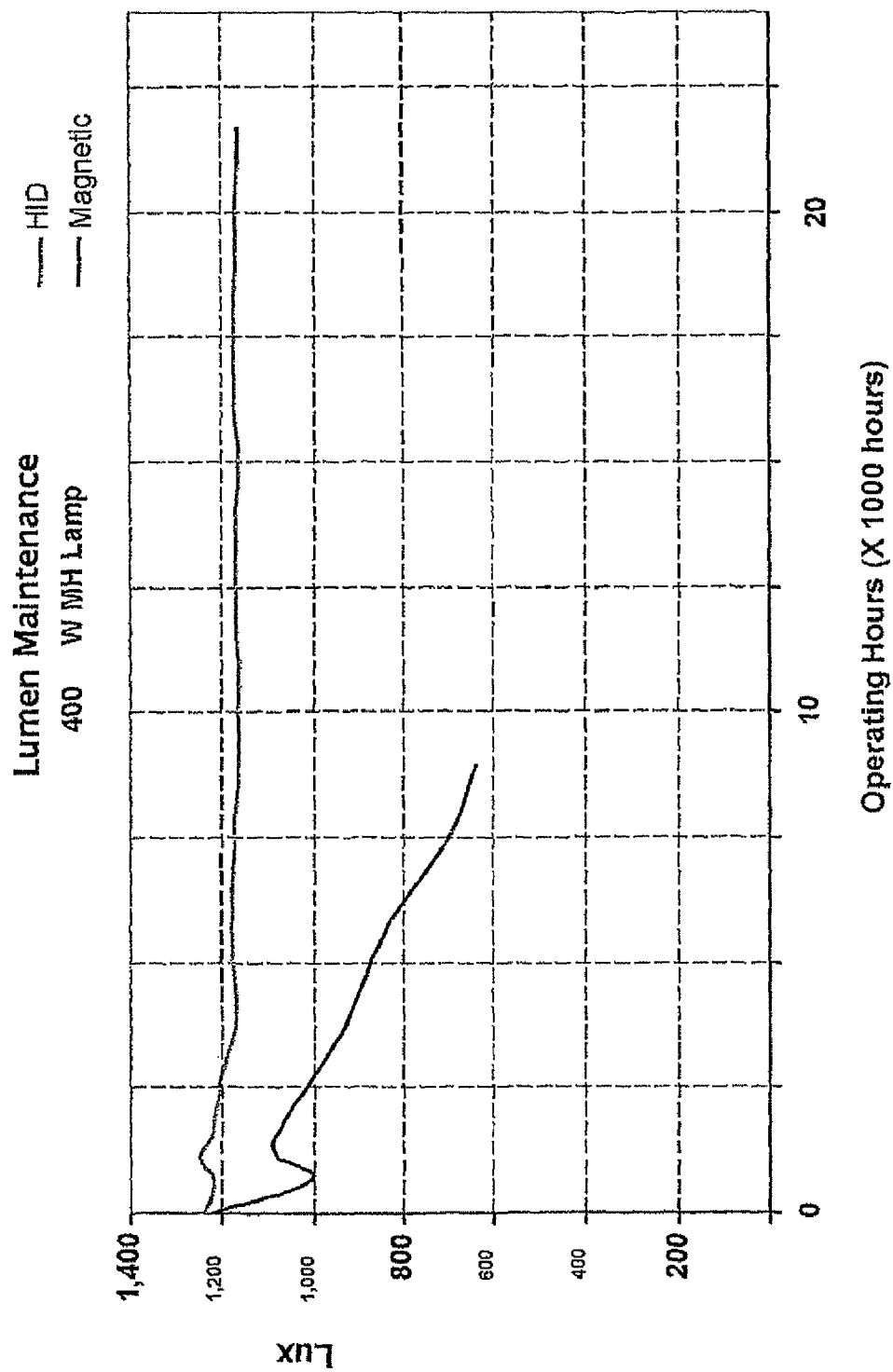
FIG. 4 is a comparison of lumen maintenance of an HD ballast operating a 400 W metal halide lamp, according to the present invention and the lumen maintenance of similar lamp being operated by a conventional magnetic ballast.

FIG. 4 illustrates evidence of performance improvement in terms of lumen maintenance. The actual lumen level at 40% of rated life for electronic operation of an embodiment of the present invention ranged from 86 to 90%. This compares to a range of 65% to 75% when used on typical prior art magnetic ballasts. This substantial improvement means the lumen levels are still higher at 30,000 hours when operated on electronic high frequency ballasts as compared to the mean lumen value at 20,000 hours when operated on magnetic ballasts.

Customized stress testing performed under worst case scenarios of short cycling (30 minutes-on/30 seconds-off) coupled with frequent hot re-strikes has shown that electronic ballasts 10 survive multiple stress cycles (1200) with no measurable differences in lamp 113/ballast 10 ignition and operating waveforms.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A method for igniting and operating a high intensity discharge (HID) lamp using an electronic ballast controlled by a ballast microcontroller, the method comprising the steps of:
   providing an ignition circuit including a parallel capacitive circuit connected in parallel to the HID lamp, said ignition circuit being resonant at an ignition resonance frequency;
   applying an ignition waveform to the HID lamp while controlling voltage and minimizing duration of the ignition waveform at said ignition resonance frequency, by receiving a feedback signal from the HID lamp during said ignition waveform, wherein said controlling is performed by the ballast microcontroller based on said feedback signal;
   upon sensing ignition, powering the HID lamp at an operation frequency under control of the ballast microcontroller, wherein both said ignition resonance frequency and said operation frequency are both in a high frequency range above fifty kilohertz;
   wherein under control of the ballast microprocessor, voltage of the HID lamp is substantially continuous during the transition from said providing ignition voltage during said ignition to said powering the HID lamp at said operation frequency.

2. The method, according to claim 1, wherein said ignition voltage does not include a significant direct current offset.

3. The method, according to claim 1, wherein current flowing through the HID lamp and voltage of the HID lamp are both substantially continuous during the transition from said providing ignition voltage during said ignition to said powering the HID lamp at said operation frequency.

4. The method, according to claim 1, wherein said ignition resonance frequency is greater than eighty kilohertz.

5. The method, according to claim 1, wherein said operation frequency is less than half said ignition resonance frequency.

6. The method, according to claim 1, wherein said ignition voltage has an absolute value peak voltage of greater than one kilovolt.

7. The method, according to claim 1, wherein said duration of said ignition waveform is within five milliseconds.

8. The method, according to claim 1, wherein said ignition voltage has an absolute value peak voltage of significantly greater than the absolute value peak operation voltage during said powering at said operation frequency.

9. The method according to claim 1, whereby said controlling voltage and said minimizing duration of the ignition waveform minimizes sputtering damage to the electrodes of the HID lamp during the lifetime of the lamp.

10. An electronic ballast controlled by a ballast microcontroller for ignition and operation of a high intensity discharge (HID) lamp, the electronic ballast comprising:
- an ignition circuit including a parallel capacitive circuit connected in parallel to the HID lamp, said ignition circuit being resonant at an ignition resonance frequency;
- a drive mechanism controlled by said ballast microcontroller, wherein said drive mechanism provides an ignition waveform to the HID lamp at said ignition resonance frequency wherein the ballast microcontroller controls voltage and duration of the ignition waveform at said ignition resonance frequency, wherein the ballast microcontroller receives a feedback signal from the HID lamp during said ignition waveform, wherein the ballast microcontroller controls said voltage and minimizes said duration of the ignition waveform based on said feedback signal;
- a sensing mechanism which senses an impedance change of the HID lamp indicating said ignition; and
- a control mechanism which controls voltage of the HID lamp to be substantially continuous during the transition from the ignition to the operation of the HID lamp.

11. The electronic ballast according to claim 10, whereby said drive mechanism minimizes sputtering damage to the electrodes of the HID lamp during the lifetime of the lamp.

12. An electronic ballast controlled by a ballast microcontroller, comprising:
- an ignition circuit including a parallel capacitive circuit connected in parallel to the HID lamp, said ignition circuit being resonant at an ignition resonance frequency;
- a drive mechanism controlled by the ballast microcontroller, wherein said drive mechanism provides an ignition waveform to the HID lamp at said ignition resonance frequency, and
- a control mechanism wherein the ballast microcontroller is adapted to control voltage and duration of the ignition waveform at said ignition resonance frequency, wherein the ballast microcontroller receives a feedback signal from the HID lamp during said ignition waveform, wherein the ballast microcontroller controls said voltage and minimizes said duration of the ignition waveform based on said feedback signal;
- a sensing mechanism configured to senses said ignition, and upon said ignition said drive mechanism operates the HID lamp at an operation frequency, wherein both said ignition resonance frequency and said operation frequency are in a high frequency range above fifty kilohertz; and
- a voltage controlled oscillator operatively connected to the drive mechanism, wherein said voltage controlled oscillator is adapted to controls both said ignition resonance frequency and said operation frequency;
- wherein the ballast microcontroller via said voltage controlled oscillator and said drive mechanism, controls voltage of the HID lamp to be substantially continuous during the transition from said ignition to operation of the HID lamp.

13. The electronic ballast according to claim 12, whereby said control mechanism minimizes sputtering damage to the electrodes of the HID lamp during the lifetime of the lamp.

* * * * *